UNITED STATES PATENT OFFICE.

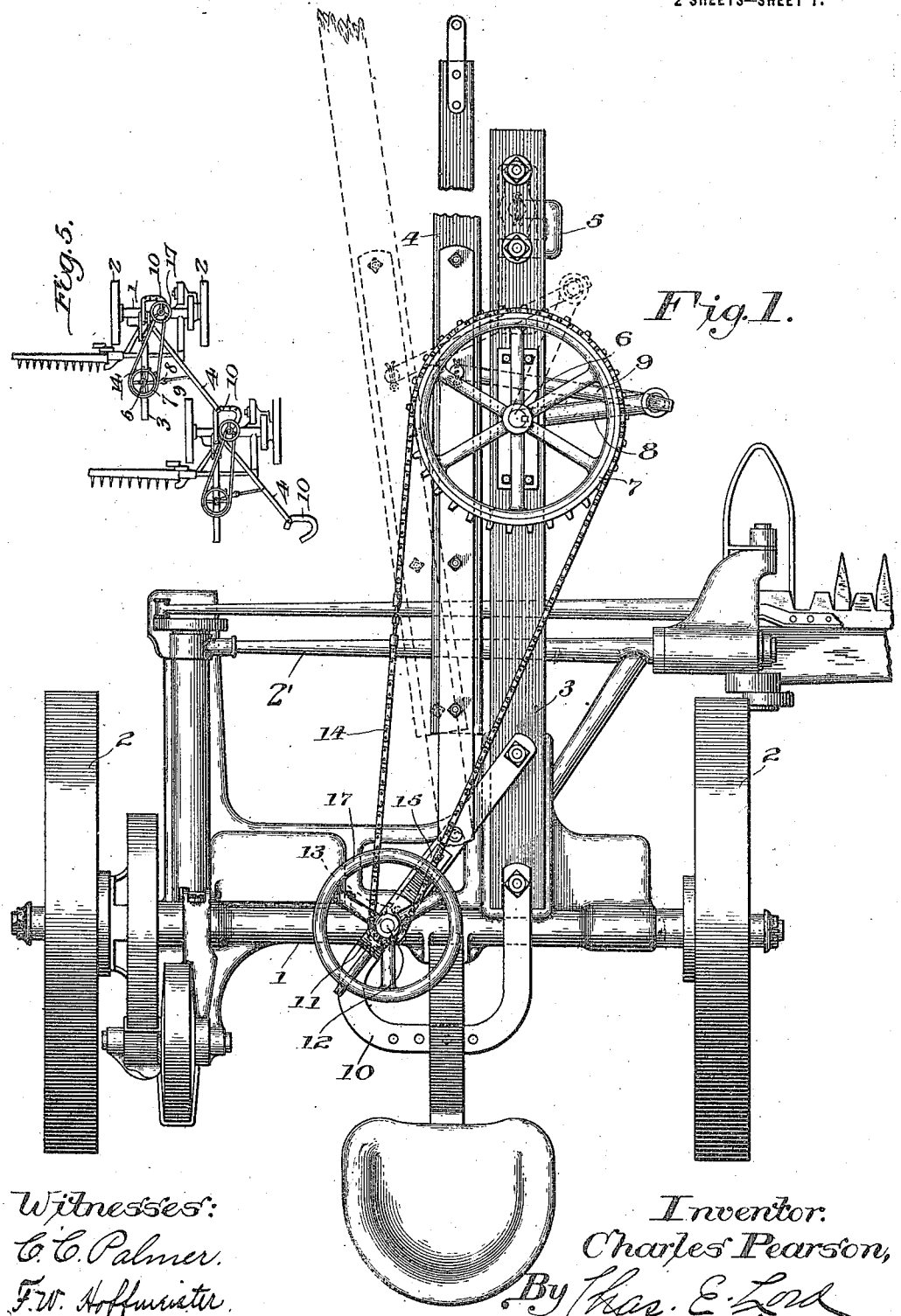

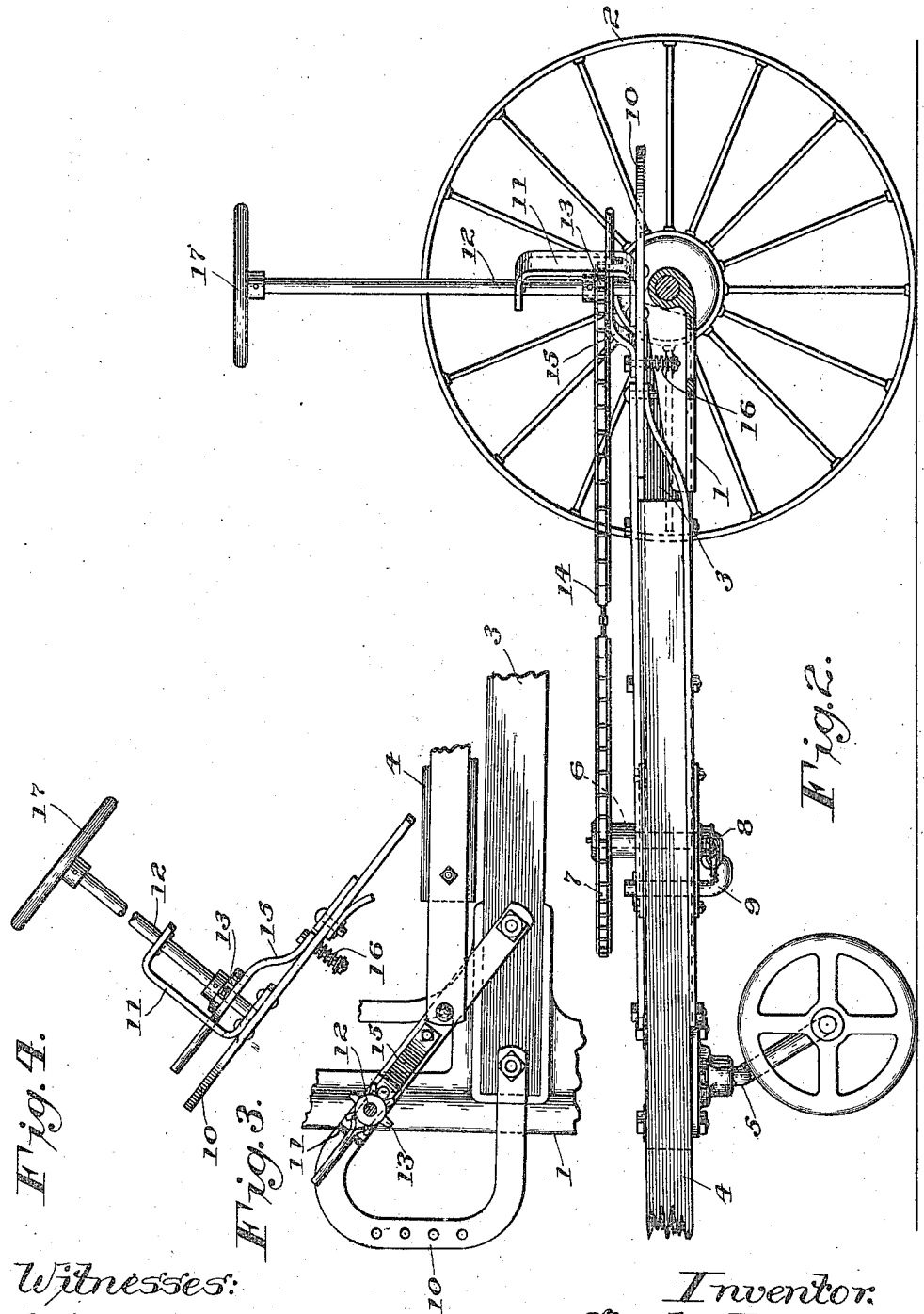

CHARLES PEARSON, OF CHICAGO, ILLINOIS, ASSIGNOR TO INTERNATIONAL HARVESTER COMPANY OF NEW JERSEY, A CORPORATION OF NEW JERSEY.

TANDEM DRAFT CONNECTION FOR MOWING-MACHINES.

1,233,396.

Specification of Letters Patent.

Patented July 17, 1917.

Application filed November 16, 1912. Serial No. 731,725.

*To all whom it may concern:*

Be it known that I, CHARLES PEARSON, a citizen of the United States, residing at Chicago, in the county of Cook and State of Illinois, have invented certain new and useful Improvements in Tandem Draft Connections for Mowing-Machines, of which the following is a specification.

My invention relates to mowing machines, and in particular to an improved form of draft connection whereby a series of machines may be drawn in tandem relation, and means for adjusting the line of draft of each machine independently of the others, the object of my invention being to provide a mechanism that may be easily manipulated, and positive and efficient in operation.

In order that my invention may be clearly and fully disclosed, I have illustrated in the accompanying drawings one embodiment which the same may assume in practice.

Figure 1 is a plan view of a mowing machine having my invention forming a part thereof;

Fig. 2 is a side elevation, partly in section, of Fig. 1;

Fig. 3 is a detached detail of part of the main frame of the machine and the steering mechanism;

Fig. 4 is a side elevation of part of the steering wheel mechanism; and

Fig. 5 is a diagrammatic view showing two mowers connected in tandem relation by means of my device.

The same reference numerals designate like parts throughout the several views.

1 represents the main frame of the machine, mounted upon carrying wheels 2, and having thereon a rising and falling coupling frame 2' of the usual construction, and, as shown, the rear end of a stub draft tongue 3 secured thereto, this stub tongue being disposed above the coupling frame. 4 represents a supplemental draft member having the rear end thereof pivotally connected with the frame of the machine and likewise disposed above the coupling frame, and 5 represents a caster wheel mechanism supporting the front end of the stub tongue. 6 represents a vertically arranged shaft journaled in the stub tongue member 3, having a sprocket wheel 7 secured to the upper end thereof and an arm 8 to its lower end, the arm being connected with the supplemental draft member 4 by means of a link 9.

10 represents a draft bracket member secured to the rear end of the main frame 1, and 11 a vertically arranged support secured to member 10 and having a shaft 12 journaled therein. Secured to the lower end of the shaft is a sprocket wheel 13 smaller than the sprocket wheel 7, and 14 represents a chain connection between the sprocket wheels 7 and 13. 15 represents a locking lever mounted upon the bracket member 10 and yieldingly held in engagement with the sprocket wheel 13 by means of a spring 16, that permits the lever to be depressed by the operator's foot in a manner to disengage the lever from the sprocket member 13 and permit the operator to turn the shaft 12 in its bearings by means of the hand wheel 17, secured to the upper end of the shaft. The mechanism is designed for use in connection with a series of mowing machines when drawn in tandem relation by means of a traction engine; the supplemental draft member of one of the machines being connected with the draw bar of an engine, and other machines of the series having their supplemental draft tongues connected with the bracket members 10. Obviously the operators may manipulate the hand wheels in a manner to vary the line of draft of each machine independent of the others by varying the angular relation of stub tongue and the supplemental draft members as shown by dotted lines in Fig. 1.

It will be noted that in my improved construction, through the provision of the braking mechanism including the member 15, under the control of the operator, the draft tongue 5 may be maintained in any desired position of adjustment, the pressure of the member 15 against the sprocket 13 being sufficient to prevent rotation of the latter and a consequent movement of the pole. It is also to be noted that through the provision of this mechanism the operator may at any time permit the pole to swing freely so that it may be adjusted by the draft, the operator, when such an adjustment is desired, simply pressing down the member 15, whereupon the sprocket 13 and its connected sprocket may rotate freely and the pole may be moved by the draft. Attention is also directed to the fact that in my improved construction a three-wheeled truck is provided which is entirely independent of the cutter mechanism, the latter being free to rise and fall and accommodate itself to uneven ground without in any way interfering with the draft mechanism which extends out over the same, the stub tongue 3 of this draft mechanism being fixed to the frame, while the draft tongue 4, though permitted a lateral movement, is also maintained against a vertical movement which would cause it to conflict with the rising and falling coupling frame.

While I have in this application specifically described one embodiment which my invention may assume in practice, it is to be understood that the form shown herein is used for purposes of illustration and that the invention may be modified and assume various other forms without departing from its spirit, it being my intention to include all such modifications within the scope of the appended claims.

What I claim as my invention, and desire to secure by Letters Patent, is:

1. In a tandem draft attachment, a frame, a laterally swinging tongue pivotally connected to said frame, tongue adjusting connection between said tongue and said frame for adjusting said tongue relative to the line of draft, and foot lever mechanism operable by an operator on said frame for holding said parts in a desired position of adjustment and releasing the same therefrom.

2. In a tandem draft connection, a frame, a laterally swinging tongue pivotally connected to said frame, tongue adjusting connections therefor including a horizontal sprocket carried by said frame, a vertical shaft carried by said frame, a second sprocket carried by said shaft, a crank arm carried by said shaft, connections between said crank and said laterally swinging tongue, and a chain connection between said sprockets whereby upon movement of said second sprocket and crank said tongue is adjusted.

3. In a tandem draft connection, a frame, a laterally swinging tongue operatively connected to said frame, a link connection between the same and said frame, and means for swinging said link connection and thereby swinging said tongue including a plurality of horizontally disposed sprockets and a chain connecting the same.

4. In a tandem draft connection, a frame, a stub tongue fixed to said frame, a laterally swinging tongue fixed against vertical movement and pivotally connected to said frame and disposed at one side of and substantially parallel to said stub tongue, and means for adjusting said laterally swinging tongue relative to said stub tongue.

5. In a tandem draft attachment, a frame, a laterally swinging tongue operatively connected thereto, means for adjusting said tongue including a rotatable member and a link connection between said tongue and frame operable by said rotatable member, and a movable braking member carried on said frame and engaging said rotatable member.

6. In a tandem draft attachment, a frame, a laterally swinging tongue operatively connected thereto, means for adjusting said tongue including a rotatable member and a link connection between said tongue and frame, and a movable resiliently mounted foot lever normally engaging said rotatable member.

7. A tandem draft connection for mowers including, in combination, a main frame, a draft tongue member secured to said main frame, a supplemental draft tongue having the rear end thereof pivotally connected with said main frame, a draft bracket secured to the rear side of said main frame, a vertically arranged shaft journaled in said fixed draft tongue, an arm secured to the lower end of said shaft, a link connection between said arm and said supplemental draft member, a gear member secured to the upper end of said shaft, and gear mechanism carried by said main frame and operative to turn said gear wheel in opposite directions.

8. A tandem draft connection for mowers including, in combination, a main frame, a draft tongue member secured to said main frame, a supplemental draft tongue having the rear end thereof pivotally connected with said main frame, a draft bracket secured to the rear side of said main frame, a vertically arranged shaft journaled on said fixed draft tongue, an arm secured to the lower end of said shaft, a link connection between said arm and said supplemental draft member, a gear member secured to the upper end of said shaft, gear mechanism carried by said main frame and operative to turn said gear wheel in opposite directions, and means for locking said gear mechanism in various positions of adjustment.

9. A tandem draft connection for mowers including, in combination, a main frame, a draft tongue member secured to said main frame, a supplemental draft tongue having the rear end thereof pivotally connected with said main frame, a draft bracket secured to the rear side of said main frame, a vertically arranged shaft journaled in said fixed draft tongue, an arm secured to the lower end of said shaft, a link connection between said arm and said supplemental draft member, a sprocket wheel secured to the upper end of said shaft, a vertically arranged shaft journaled upon said main frame, having a hand wheel secured to the upper end thereof, and a sprocket wheel to its lower end, and a chain connecting said sprocket wheels.

10. A tandem draft connection for mowers including, in combination, a main frame, a draft tongue member secured to said main frame, a supplemental draft tongue having the rear end thereof pivotally connected with said main frame, a draft bracket secured to the rear side of said main frame, a vertically arranged shaft journaled in said fixed draft tongue, an arm secured to the lower end of said shaft, a link connection between said arm and said supplemental draft member, a sprocket wheel secured to the upper end of said shaft, a vertically arranged shaft journaled upon said main frame, having a hand wheel secured to the upper end thereof, and a sprocket wheel to its lower end, a chain operatively connecting said sprocket wheels, and a spring-pressed foot lever carried by said main frame and adapted to lock said second sprocket wheel in any desired position of adjustment.

CHARLES PEARSON.

Witnesses:
 RAY PATTISON,
 RAY D. LEE.

Copies of this patent may be obtained for five cents each, by addressing the "Commissioner of Patents, Washington, D. C."